(12) United States Patent
King

(10) Patent No.: US 9,263,182 B2
(45) Date of Patent: Feb. 16, 2016

(54) CONTROL DISTRIBUTION TRANSFORMER AND METHOD OF MAKING SAME

(71) Applicant: General Electric Company, Schenectady, NY (US)

(72) Inventor: Robert Dean King, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 13/723,726

(22) Filed: Dec. 21, 2012

(65) Prior Publication Data

US 2013/0141074 A1    Jun. 6, 2013

Related U.S. Application Data

(63) Continuation-in-part of application No. 12/751,151, filed on Mar. 31, 2010, now Pat. No. 8,340,833.

(51) Int. Cl.
| | | |
|---|---|---|
| H01F 38/00 | (2006.01) | |
| G01S 5/00 | (2006.01) | |
| G01S 19/07 | (2010.01) | |
| G01S 19/14 | (2010.01) | |
| H02J 13/00 | (2006.01) | |
| B60L 11/18 | (2006.01) | |
| H02J 3/14 | (2006.01) | |

(52) U.S. Cl.
CPC ............. *H01F 38/00* (2013.01); *G01S 5/0009* (2013.01); *G01S 5/009* (2013.01); *G01S 19/07* (2013.01); *G01S 19/14* (2013.01); *H02J 13/002* (2013.01); *B60L 11/1844* (2013.01); *H02J 3/14* (2013.01); *Y02E 60/721* (2013.01); *Y02T 10/7005* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y04S 10/126* (2013.01)

(58) Field of Classification Search
None
See application file for complete search history.

(56) References Cited

U.S. PATENT DOCUMENTS

| | | |
|---|---|---|
| 2,874,310 A | 2/1959 | Young |
| 4,235,101 A | 11/1980 | Stadelmann |

(Continued)

FOREIGN PATENT DOCUMENTS

| | | |
|---|---|---|
| CN | 1347184 A | 5/2002 |
| JP | 2005-168258 A | 6/2005 |

(Continued)

OTHER PUBLICATIONS

Unofficial English translation of CN Office Action issued Apr. 25, 2014 in connection with corresponding CN Patent Application No. 201110093474.1.

*Primary Examiner* — Ryan Jarrett
(74) *Attorney, Agent, or Firm* — Meagher Emanuel Laks Goldberg & Liao, LLP

(57) ABSTRACT

A distribution transformer comprises a sensor system and a communications module. The distribution transformer is configured to convert a first high voltage electricity from a high voltage distribution line to a first low voltage electricity and convey the first low voltage electricity along a low voltage line to an electrical device. The sensor system is configured to determine a temperature of the distribution transformer, and the communications module is configured to transmit a load reduction request along the low voltage line to the electrical device based on the temperature of the distribution transformer.

18 Claims, 5 Drawing Sheets

(56) References Cited

U.S. PATENT DOCUMENTS

| | | |
|---|---|---|
| 4,694,192 A | 9/1987 | Payne et al. |
| 4,712,097 A | 12/1987 | Hashimoto |
| 4,804,938 A | 2/1989 | Rouse et al. |
| 6,538,343 B1 | 3/2003 | Stewart |
| 7,327,134 B1 | 2/2008 | Weng et al. |
| 7,376,491 B2 | 5/2008 | Walling et al. |
| 7,599,161 B2 | 10/2009 | Premerlani et al. |
| 8,340,833 B2 | 12/2012 | Hershey et al. |
| 2002/0110310 A1 | 8/2002 | Kline |
| 2005/0207081 A1 | 9/2005 | Ying |
| 2006/0284647 A1 | 12/2006 | Gunn et al. |
| 2007/0299562 A1 | 12/2007 | Kates |
| 2008/0077336 A1 | 3/2008 | Fernandes |
| 2008/0172312 A1 | 7/2008 | Synesiou et al. |
| 2009/0187358 A1 | 7/2009 | Deaver, Sr. |
| 2009/0261779 A1 | 10/2009 | Zyren |
| 2011/0122798 A1* | 5/2011 | Hughes et al. ............... 370/254 |
| 2013/0043725 A1* | 2/2013 | Birkelund ..................... 307/24 |

FOREIGN PATENT DOCUMENTS

| | | |
|---|---|---|
| JP | 2008-263712 A | 10/2008 |
| WO | 9522190 A1 | 8/1995 |
| WO | 2008148418 A1 | 12/2008 |
| WO | WO 2011012135 A2 * | 2/2011 |

* cited by examiner

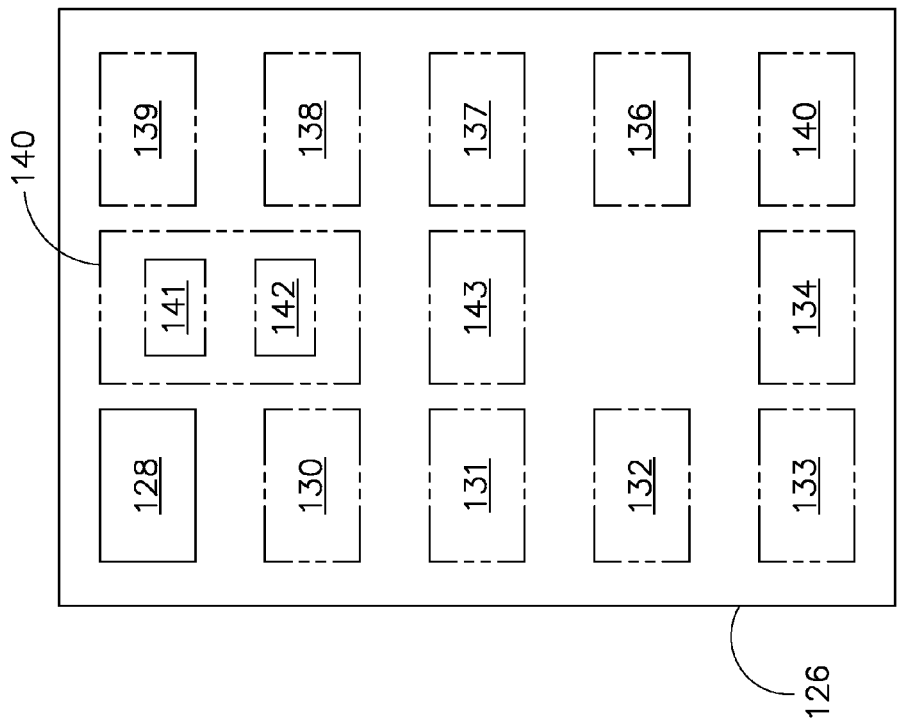
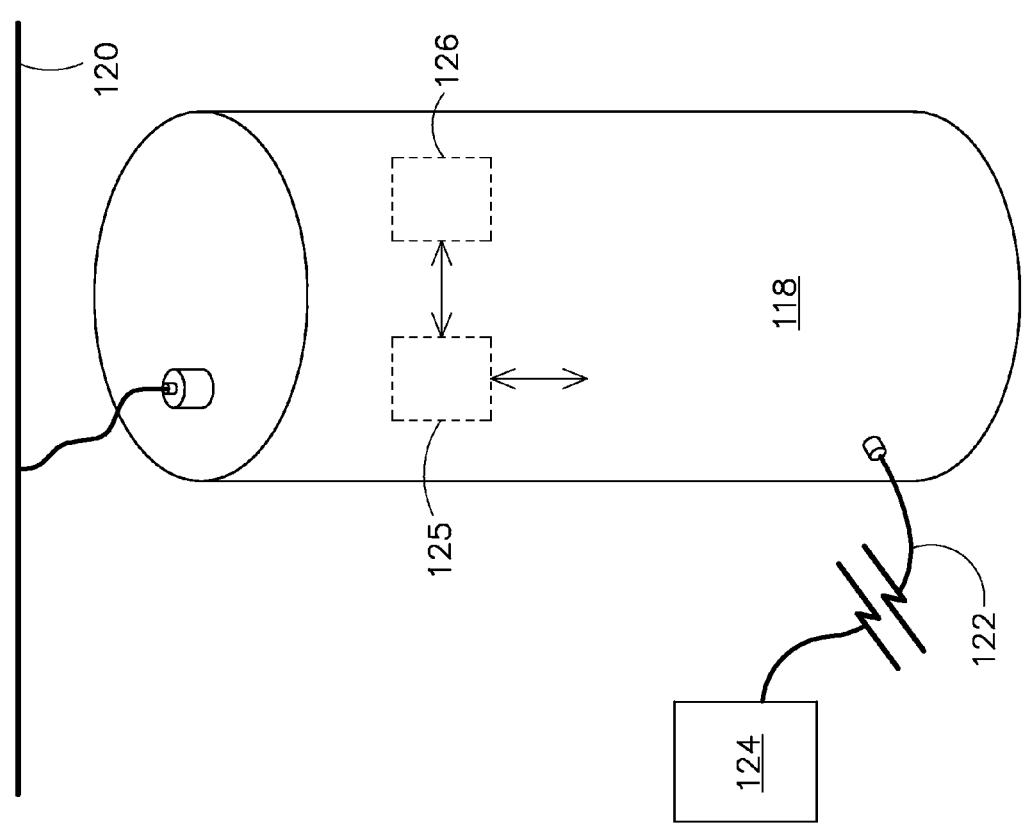

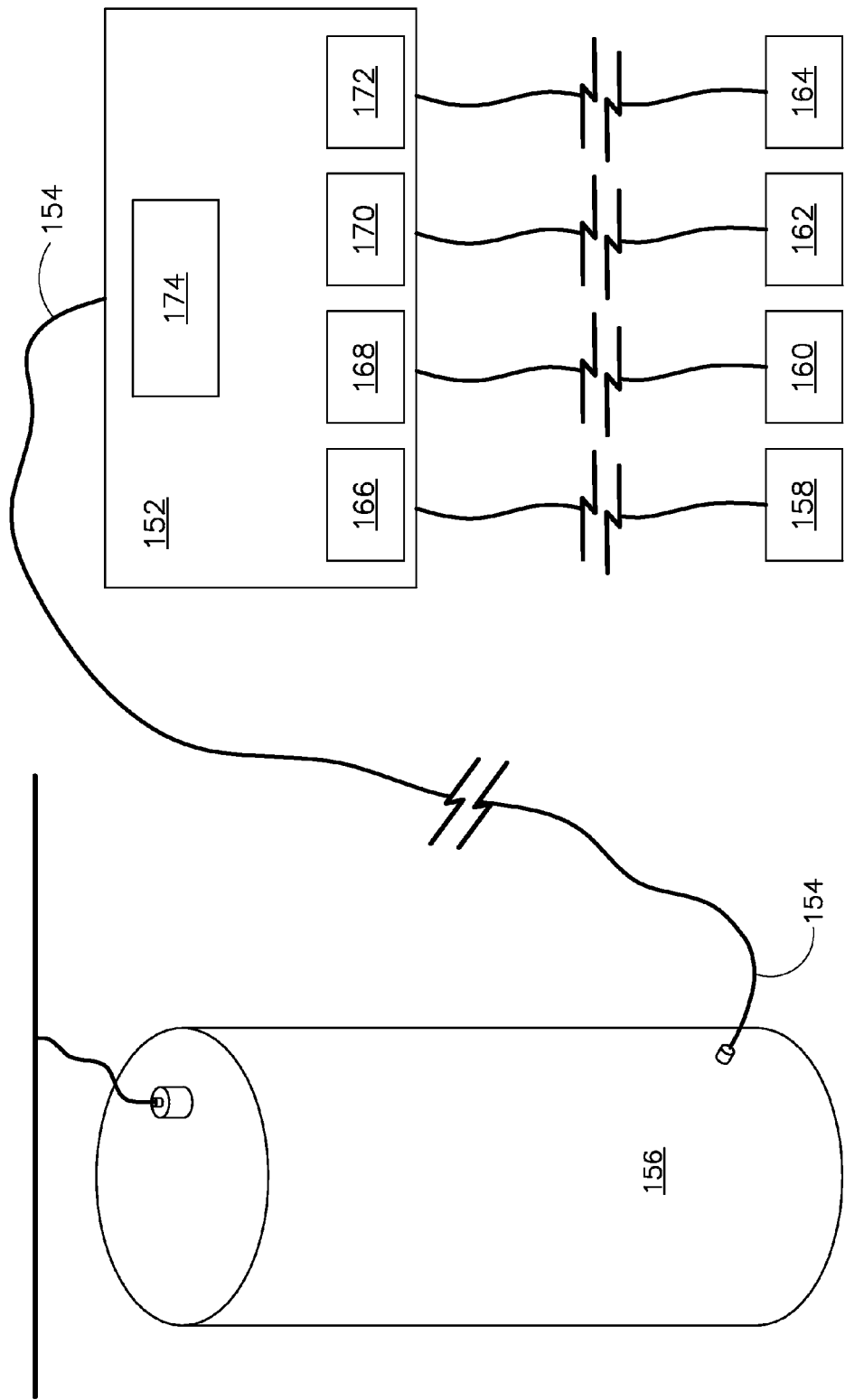

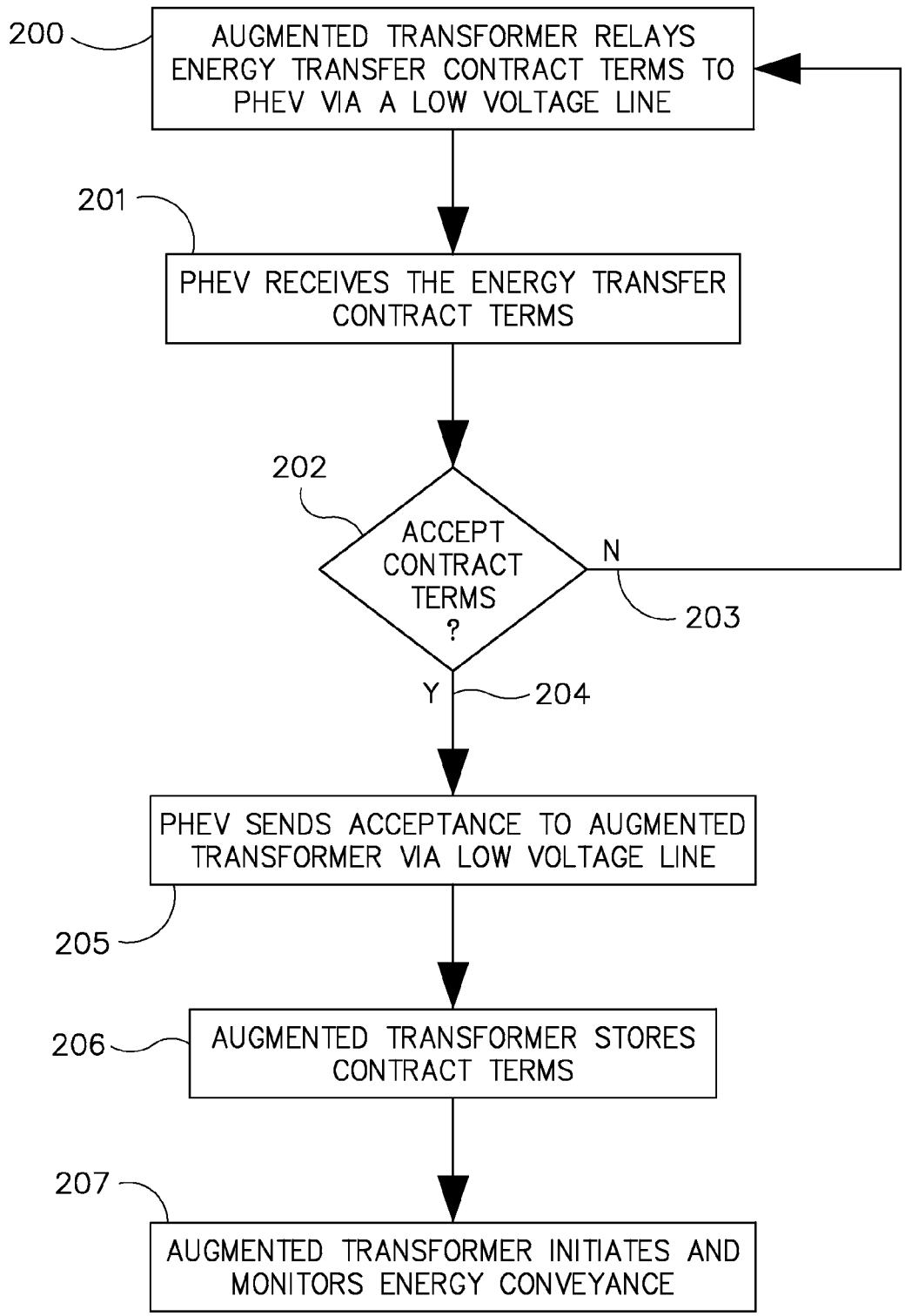

CONTROL DISTRIBUTION TRANSFORMER AND METHOD OF MAKING SAME

CROSS-REFERENCE TO RELATED APPLICATION

The present application is a continuation-in-part of and claims priority to U.S. patent application Ser. No. 12/751,151 filed Mar. 31, 2010, the disclosure of which is incorporated herein.

BACKGROUND OF THE INVENTION

Embodiments of the invention relate generally to distribution transformers and, more particularly, to a distribution transformer capable of relaying information to one or more electrical devices.

As the human population increases, so generally does energy consumption. Generally, electrical power grids have the capacity to provide electrical energy to its respective consumers or customers. However, at times, a power grid may begin operating beyond its recommended capacity. This scenario will typically arise when electrical supply cannot meet the load demand. For example, during summer months in warm climates, the load demand produced by air-conditioners or the like can cause a grid to operate above its recommended load capacity. This excessive load demand can have detrimental effects on the grid. For example, on a "global" scale in terms of the overall grid, grid failure can occur, and large segments of the population that rely on the grid may go without power for a period of time.

Detrimental effects can also occur on a smaller scale. For example, a transformer that supplies energy to one or more consumers may become overloaded, though the grid of which the transformer is a part of remains healthy. In such a scenario, the overloaded transformer may fail, causing the respective consumers to be without power for a period of time.

It would therefore be desirable to provide an apparatus and method for reducing loads on transformers and/or power grids when desired.

BRIEF DESCRIPTION OF THE INVENTION

In accordance with one aspect of the invention, a system comprises a distribution transformer comprising a communications module and a sensor system. The distribution transformer is configured to convert a first high voltage electricity from a high voltage distribution line to a first low voltage electricity and convey the first low voltage electricity along a low voltage line to an electrical device. The sensor system is configured to determine a temperature of the distribution transformer, and the communications module is configured to transmit a load reduction request along the low voltage line to the electrical device based on the temperature of the distribution transformer.

In accordance with another aspect of the invention, a method of manufacturing an electrical system comprises assembling a distribution transformer capable of stepping down high voltage electricity from a high voltage distribution line and conveying stepped down electricity along a low voltage line to power an electrical device, wherein the high voltage distribution line is configured to transfer a higher voltage electricity than the low voltage line. The method also includes configuring a sensor system to determine a temperature of the distribution transformer, generating a load reduction request to reduce a load drawn from the distribution transformer by the electrical device based on the temperature of the distribution transformer, and coupling a communications module to the distribution transformer and to the low voltage line, the communications module configured to convey the load reduction request along the low voltage line to the electrical device.

In accordance with yet another aspect of the invention, an apparatus comprises a distribution transformer configured to step down electricity received from a high voltage distribution power line and to provide the stepped down electricity to an electrical device via a low voltage power line. The apparatus also includes a temperature sensor system configured to determine a temperature of the distribution transformer and a communications system coupled to the distribution transformer and configured to transmit a request along the low voltage line to the electrical device, wherein the request is a request to reduce a load on the distribution transformer based on a temperature of the distribution transformer.

Various other features and advantages will be made apparent from the following detailed description and the drawings.

BRIEF DESCRIPTION OF THE DRAWINGS

The drawings illustrate embodiments presently contemplated for carrying out the invention.

In the drawings:

FIG. 2 is a block diagram of an augmented transformer according to another embodiment of the invention.

FIG. 3 is a block diagram of the communications module of FIG. 2 according to an embodiment of the invention.

FIG. 4 is a block diagram of an intermediary electrical device according to an embodiment of the invention.

FIG. 6 is a flowchart of a technique for engaging in an energy transfer between an augmented transformer and an electric device according to an embodiment of the invention.

DETAILED DESCRIPTION

Electrical generation facilities or systems generally deliver high voltage electricity along distribution lines to residential and/or commercial customers. This high voltage electricity is often on the order of several kilovolts. Generally, at or near the point of consumption, the distribution line's high voltage energy is stepped down to a lower utility voltage energy by a step-down distribution transformer before the energy is conveyed to a consumer via one or more low voltage lines. Often, these distribution transformers are located many feet above ground on power poles, located outdoors in safety-shielded containers on a structural support slab on the ground, located underground, or located inside a building within a safety shielded enclosure.

In general, it is beneficial to minimize any voltage drop between the low voltage side of a distribution transformer and an electrical device receiving power from the distribution transformer. As such, since there is generally a voltage drop per linear distance unit along the low voltage line(s), distribution transformers are typically located as near the point of energy consumption as possible subject to regulation and economic constraints.

Since a distribution transformer is often located as near the point of energy consumption as possible considering the regulation and economic constraints, the location of the distribution transformer also provides a good approximation of an electrical device's location. That is, an electrical device connected to receive power from the distribution transformer is generally located near the distribution transformer.

Accordingly, the location of a distribution transformer can provide an approximate location of a consumer or electric device. Further, a distribution transformer can also serve as a node where consumer load can be managed. Due in part to the location of distribution transformers, the distribution transformer can be considered a point of entry into an electrical power grid. That is, via a distribution transformer, consumers are generally allowed to access the energy of the high voltage distribution lines. As such, since many consumers enter the grid via a distribution transformer, distribution transformers serve as a node where consumer load can be managed.

Figure 1:
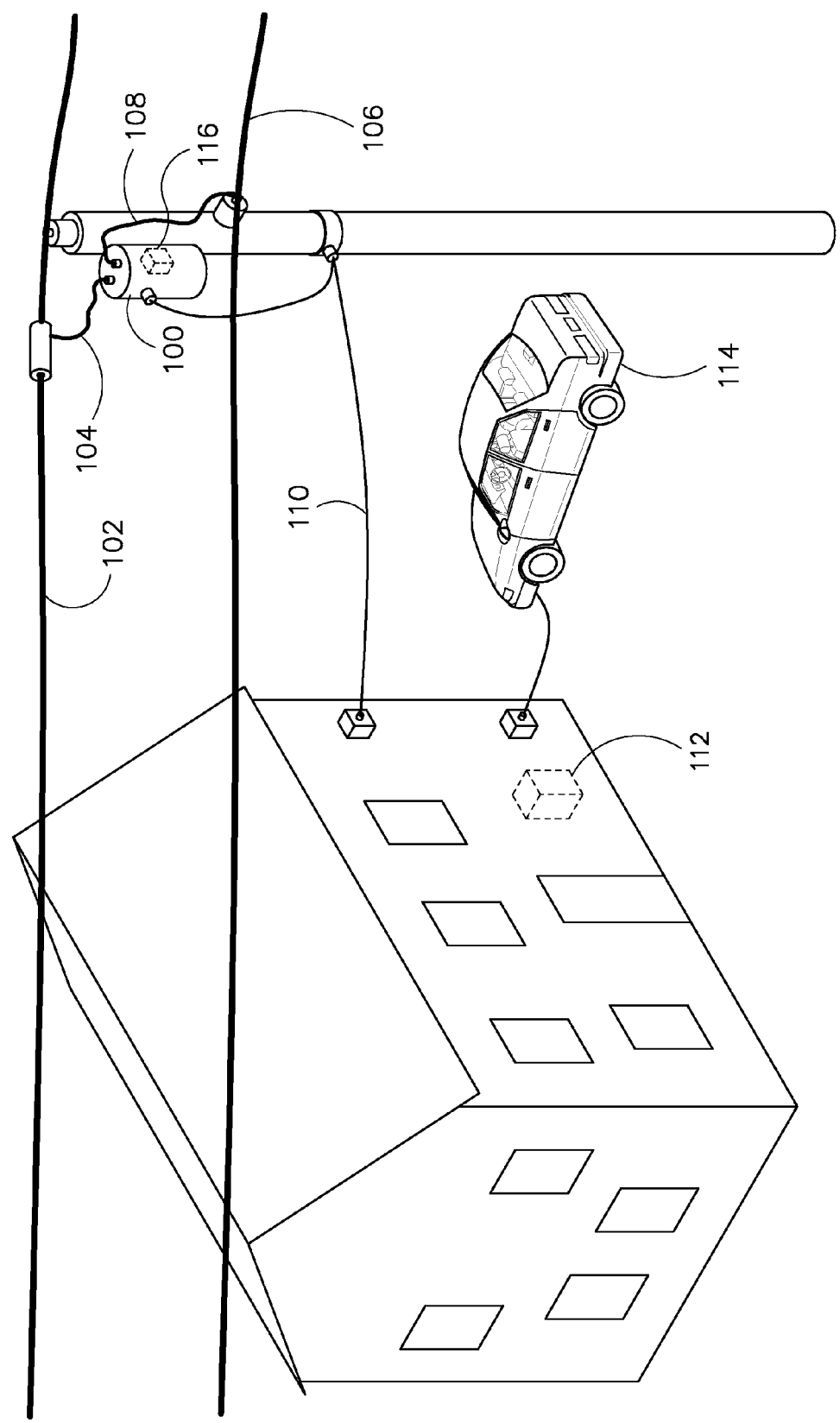
FIG. 1 is a block diagram of an augmented transformer according to an embodiment of the invention.

FIG. 1 is a block diagram of a control or augmented distribution transformer 100 according to an embodiment of the invention. Augmented distribution transformer 100 is coupled to a high voltage distribution line 102 via a first conductor 104 and is also coupled to a neutral line 106 via a second conductor 108. Augmented distribution transformer 100 is configured to step down high voltage electricity from high voltage distribution line 102 to a lower voltage electricity, which is passed along a low voltage line 110 to an electrical device 112 and/or other electrical devices such as a plug-in electric hybrid vehicle (PHEV) PHEV 114. In addition, augmented distribution transformer 100 is configured to step up electricity received from electrical device 112 or PHEV 114 via low voltage line 110 and provide the stepped up electricity to high voltage distribution line 102.

Though one low voltage line 110 is depicted in FIG. 1, it is contemplated that augmented distribution transformer 100 be configured to pass low voltage electricity along more than one low voltage line such as, for example, three low voltage lines (not shown) in a three-phase setting. Likewise, though only one high voltage distribution line 102 is shown, it is contemplated that augmented transformer 100 may be configured to receive high voltage electricity from more than one high voltage distribution line (not shown). For example, augmented distribution transformer 100 may be configured to receive high voltage electricity from three high voltage distribution lines in a three-phase setting.

Augmented distribution transformer 100 includes a communications module 116 that is configured to transmit a load reduction request along low voltage line 110 to electrical device 112 and/or PHEV 114. The load reduction request is a request to reduce a load on augmented distribution transformer 100. In response to the request, electrical device 112 and/or PHEV 114 may reduce its load. Accordingly, wear on augmented distribution transformer 100 as well as the load on the grid (not shown) may be reduced or minimized.

It is contemplated that augmented distribution transformer 100 may also be configured to provide temporal information (e.g., local time) and/or geographic information along low voltage lines 110 to electrical device 112 and/or PHEV 114. It is envisioned that the geographic information includes the geographic location of augmented distribution transformer 100. Since it is likely that augmented distribution transformer 100 is within the proximity of electrical device 112 and PHEV 114, it is also likely that the geographic information serves as an approximation of the location of electrical device 112 and PHEV 114.

It is noted that electrical device 112 and PHEV 114 are merely exemplary electrical devices and that augmented distribution 100 transformer is capable of providing temporal and geographic information to a variety of electrical devices (not shown).

Electrical device 112 and/or PHEV 114 can use the temporal and geographic location for a variety of purposes. According to one example, electrical device 112 may be a clock or include a clock. As such, the temporal information can be used to set the clock to the local time once the clock is energized via low voltage line 110. Alternatively, electrical device 112 could simply be a display that has the ability to display the time information. Such a device need not have time keeping capabilities. As such, the time information would be provided by communication module 116 along low voltage line 110 to electrical device 112, and electrical device 112 would simply present a visual depiction of the time information. In contrast to many common clocks that require time keeping capabilities and related circuitry, electrical device 112 needs only the capability to display the received time information.

Like the clock display discussed above, DVD players, ovens, microwaves, refrigerators, or other devices that often include clocks could instead simply include a display, rather than a "clock" having time keeping capabilities. As such, manufacturing cost of these devices could be reduced.

As with the temporal or time information, it is contemplated that the geographic information could be used for a variety of purposes. For example, PHEV 114 may have the ability to utilize the geographic information. PHEV 114 may store the location information each time PHEV 114 receives a charge from an energy provider or each time PHEV 114 provides energy to an energy provider. The stored geographic information could then later be used to, for example, verify an energy provider credit or debit.

An exemplary scenario will be illustrative of a such a verification technique. For example, an owner of a PHEV (e.g., PHEV 114) that resides in the state of New York may travel to Texas for leisure or work. While in Texas, the owner may plug into an energy provider's grid via low voltage line(s) (e.g., low voltage line 110) and an augmented distribution transformer (e.g., augmented distribution transformer 100) to receive a charge. The PHEV then receives a charge and stores the received temporal and geographic information.

Later, the owner may receive a bill or invoice receipt detailing the cost of energy provided to the PHEV while in Texas. The owner can then access the stored geographic information and verify that indeed he was in Texas during the billing period and that his PHEV did receive a charge while there. Further, the owner can access the temporal information to determine how long the PHEV was in the charge state. By accessing the temporal and geographic information, a consumer or owner could determine whether or not the bill is accurate. Such a bill or invoice receipt could be inaccurate for several reasons. For example, the energy provider may have made a billing error. Alternatively, the identification information of the PHEV could have been "spoofed." That is, identification information of a PHEV could have been hijacked by a criminal and improperly used such that when the criminal charges his vehicle, the energy provider is "spoofed" into believing the PHEV belongs to another.

In yet another example, an energy provider can utilize geographic information to aid in load balancing. For example, several PHEVs in the same geographic region may be coupled to a utility via one or more augmented transformers. In such a scenario, before receiving charge, each PHEV would authenticate itself to the energy provider. In addition, each PHEV may send geographic location information received from the augmented transformers to the energy provider. By knowing the number of PHEVs accepting a charge in a particular region, the energy provider could then assess the load on particular augmented transformers or on regions of the utility grid. If it is determined that a particular augmented transformer has reached capacity or that a portion of the "grid" has reached capacity, the energy provider may postpone the conveyance of energy to one or more PHEVs until the load has decreased.

Embodiments of the invention are not limited to the above-described clocks, clock displays, or PHEVs. That is, according to embodiments of the invention, the augmented transformer (e.g., augmented distribution transformer 100) is capable of conveying load reduction requests, geographic information, and/or time information to any device capable of receiving such information. It is also noted that the augmented transformer is capable of conveying energy to multiple consumers.

Referring now to FIG. 2, a block diagram of an augmented distribution transformer 118 is shown according to another embodiment of the invention. As with augmented distribution transformer 100 of FIG. 1, augmented distribution transformer 118 of FIG. 2 is configured to step down high voltage electricity from a high voltage distribution line 120 and provide a lower voltage electricity along a low voltage line 122 to an electrical device 124. Though high voltage distribution line 120 and low voltage line 122 are each respectively depicted as a single line, it is contemplated that high voltage distribution line 120 may represent multiple lines (e.g., three high voltage lines for three phases) and that low voltage line 122 may represent multiple lines.

It is contemplated that augmented distribution transformer 118 may also be configured to step up low voltage electricity from low voltage line 122 and provide a higher voltage electricity to high voltage distribution line 120.

Augmented distribution transformer 118 includes a communications module or system 126 configured to transmit or convey a load reduction request along low voltage line 122 to electrical device 124. The load reduction request may be sent, for example, when it is determined that grid load or the load on augmented distribution transformer 118 is at or above a predetermined threshold. Communications system 126 may be configured to transmit the load reduction request based on the knowledge that electrical device 124 is both connected to augmented distribution transformer 118 to receive power therefrom and is willing and able to reduce its load drawn on the system. In response thereto, electrical device 124 may reduce a load drawn thereby on augmented distribution transformer 118, thus minimizing wear on augmented distribution transformer 118. Further, such load reduction may reduce the chance of overload on the electrical grid (not shown) to which augmented distribution transformer 118 is coupled via high voltage distribution line 120.

It is contemplated that augmented distribution transformer 118 may also be configured to relay temporal and geographic information to electrical device 124 via low voltage line 122. Though FIG. 2 only depicts one electrical device 124 coupled to augmented distribution transformer 118 via low voltage line 122, it is contemplated that augmented distribution transformer 118 may be configured to pass the load reduction request and the temporal and geographic information to more than one electrical device coupled thereto via one or more low voltage lines (e.g., low voltage line 120). Further, electrical device 124 may merely be an intermediary between augmented transformer 118 and another electrical device (not shown) coupled to electrical device 124. An example of such an intermediary device will be described in detail below with respect to FIG. 4.

Still referring to FIG. 2, augmented distribution transformer 118 includes a cooling system 125 configured to cool augmented distribution transformer 118 and components thereof. Cooling system 125 may reduce heat buildup in augmented distribution transformer 118 via a gaseous or liquid coolant. For example, the coolant in cooling system 125 may be a gaseous coolant such as air or a liquid coolant such as oil.

It is contemplated that communications module 126 may include one or more components, systems, or modules to provide various types of functionality thereto. For example, referring also to FIG. 3, according to embodiments of the invention, communications module 126 includes a power line communication (PLC) module 128 configured to relay the load reduction request to electrical device 124. According to another embodiment, communications module 126 may also be configured to relay the local time and geographic information along low voltage line 122 to electrical device 124.

It is contemplated that communications module 126 may also include other components, systems, or modules. For example, communications module 126 may include a load sensing system 130, an antenna 131, an Internet server 132, a GPS module 133, an authentication module 134, an encryption module 135, a memory module 136, a radiation detector 137, a diagnostic module 138, a processor 139, a sensor system 140 including an ambient temperature sensor 141 and a transformer temperature sensor 142, and/or a battery 143, where modules 130-143 are shown in phantom. Further details regarding the various components (i.e., modules or components 128-143) will be set forth below. Communications module 126 is thermally coupled to cooling system 125 to allow heat dissipation and cooling thereof together with modules or components 128-143.

It is contemplated that PLC module 128 may be configured to provide a load reduction request, as well as the temporal and geographic information, along low voltage line 122 to electrical device 124. In addition, it is contemplated that PLC 128 may be configured to maximize the efficiency of sending the load reduction request and the temporal and geographic information along low voltage line 122 while minimizing inductive coupling between high voltage distribution line 120 and low voltage line 122. As such, PLC module 128 may be configured to reduce or eliminate the injection of noise into high voltage distribution line 120 during the conveyance of the temporal information, geographic information, and/or the load reduction request.

According to another embodiment, it is contemplated that PLC module 128 may also be configured to receive information sent along high voltage distribution line 120. For example, PLC module 128 may be configured to receive, via high voltage distribution line 120, a load reduction transmit command that initiates the transmission of the load reduction request to electrical device 124. According to such an embodiment, it is envisioned that the transmit command could be sent from a location remote from augmented distribution transformer 118 when it is remotely determined that the load level(s) of augmented distribution transformer 118 reach or exceed a predetermined threshold level. In other words, a control mechanism (not shown) of the grid could determine that the load level(s) of augmented distribution transformer 118 should be reduced in order to protect the functionality of augmented distribution transformer 118 and/or the grid itself. In such a scenario, the controlling mechanism may relay a load reduction transmit command to augmented distribution transformer 118. In response thereto, augmented distribution transformer 118 may be configured to transmit or relay a load reduction request, via PLC module 128, along low voltage line 122 to electrical device 124.

In an alternate embodiment, rather than remotely determining load level(s), it is contemplated that augmented distribution transformer 118 locally determine load level(s). For example, load sensing system 130 may include one or more sensors (not shown) to determine load level(s) of the load drawn on augmented distribution transformer 118. Processor 139 may then determine if the load level(s) or values meet or exceed one or more predetermined threshold value(s). 139 If the predetermined threshold value(s) are met or exceeded, processor 139 may cause communications module 126 to transmit the load reduction request along low voltage line 122 to electrical device 124.

In yet another embodiment, transformer temperature sensor 142 may be configured to sense a temperature of a component, system, or module of augmented distribution transformer 118 and deliver the sensed temperature to diagnostic module 138 or processor 139. For example, transformer temperature sensor 142 may sense a temperature of the coolant flowing in cooling system 125 to determine whether the temperature of augmented distribution transformer 118 or any component thereof is approaching, at, or above a temperature threshold considered to reduce the life or performance of augmented distribution transformer 118. Based on this determination, diagnostic module 138 or processor 139 may cause communications module 126 to transmit the load reduction request along low voltage line 122 to electrical device 124.

Referring back to PLC module 128, it is contemplated that PLC module 128 may also be configured to receive other information, such as the local time and geographic information, from an energy provider or another party via high voltage distribution line 120. Further, PLC module 128 may be configured to provide information or data along high voltage distribution line 120 to an energy provider or another party (not shown).

Alternatively, or in addition thereto, it is contemplated that communications module or system 126 may include antenna 131 configured to wirelessly receive load reduction transmit commands generated remotely. Further, antenna 131 may be configured to wirelessly receive the temporal and/or geographic location information that may be provided to electrical device 124 via low voltage line 122.

Upon receiving the load reduction transmit command, the temporal information, and/or geographic information via antenna 131, communications module 126 may provide such information to electrical device 124 via low voltage line 122.

As explained above, it is contemplated that communications module 126 may include Internet server 132. It is contemplated that Internet server 132 may be configured to provide a data transport access for augmented distribution transformer 118 using the Internet. Accordingly, augmented distribution transformer 118 may employ Internet server 132 for messaging across the Internet. Such messaging could include the power line transport of data to an energy provider or another party (e.g., a consumer).

In order to determine the geographic information, it is contemplated that communications module 126 includes global positioning system (GPS) module 133 configured to determine the geographic location of augmented distribution transformer 118. According to such an embodiment, GPS module 133 calculates the geographic information, and communications module 126 then sends the geographic location information along low voltage line 122 to electrical device 124. GPS module 133 may have the ability to calculate a global position from satellite signals or information relating thereto.

If position errors are present in the geographic information, it is contemplated that GPS module 133 may also be configured to correct for such errors. For example, GPS module 133 may have differential global positioning system (DGPS) capabilities. In such an embodiment, GPS module 133 may utilize a priori information pertaining to the location of augmented distribution transformer 118 to determine a position correction. That is, GPS module 133 may have its location pre-programmed therein. This pre-programmed information (i.e., a verified location) may then be compared with its global position as calculated from satellite signals to determine a difference therebetween. A position correction may then be determined from the comparison. It is contemplated that augmented distribution transformer 118 may be configured to wirelessly broadcast the position correction information via antenna 131 to other devices (not shown). Accordingly, other devices (not shown) having GPS capabilities and within the proximity of augmented distribution transformer 118 may utilize the position correction information to correct for satellite signal errors.

It is contemplated that, rather than employing GPS module 133 to determine the geographic location of augmented distribution transformer 118, communications module 126 may employ a LORAN or other type of device (not shown) to determine the geographic location of augmented distribution transformer 118.

As set forth above, communications module 126 of augmented distribution transformer 118 may also include authentication module 134. According to an embodiment of the invention, authentication module 134 is configured to authenticate communications sent between communications module 126 and electrical device 124. For example, authentication module 134 may be configured to require that electrical device 124 be identified prior to any exchange of energy. In such a scenario, electrical device 124 may authenticate itself to authentication module 134, and authentication module 134 could determine, via the authentication, whether or not electrical device 124 has permission to receive energy from augmented distribution transformer 118 and/or whether electrical device 124 has permission to provide energy to high voltage distribution line 120 via augmented distribution transformer 118. Augmented distribution transformer 118 may also, via authentication module 134, have the ability to determine what type of device electrical device 124 is via the authentication sent along low voltage line 122. For example, authentication module 134 may determine that electrical device 124 is a dishwasher, PHEV, or a heating and cooling system.

Referring now to encryption module 135, in order to protect information or data sent between augmented transformer 118 and electrical device 124 or between augmented distribution transformer 118 and high voltage distribution line 120, encryption module 135 may be configured to ensure that such information or data is encrypted to address privacy issues. It is contemplated that encryption module 135 may also be configured to decrypt data received via low voltage line 122 or high voltage distribution line 120.

In addition to being configured to relay load reduction requests, temporal information, and/or geographic information to electrical device 124 via low voltage line 110, it is contemplated that communications module 126 may also be configured to relay other types of information.

For example, communications module 126 may be configured to relay contractual information pertaining to the sale or purchase of energy. For example, electrical device 124 may be a PHEV, and communications module 126 may be configured to relay contractual information to PHEV along low voltage line 122 so that PHEV can determine whether or not to enter into a contractual relationship with an energy provider to purchase energy (i.e., receive a charge) therefrom or to sell energy thereto. A technique exemplifying the relay of such contractual information will be described below in detail with respect to FIGS. 5 and 6.

Still referring to FIGS. 2 and 3, it is contemplated that communications module 126 also includes memory module 136, where memory module 136 is configured to store information. Memory module 136 may include one or more tangible data storage devices such as a magnetic drive, optical drive, integrated circuits, or other type of tangible computer readable storage media. The information stored in memory module 136 may include information representing, for example, the time at which electrical device 124 consumed electricity, a quantity of energy consumed by the electric device 124, the cost of the energy consumed from electrical device 124, the quantity of energy received by electrical device 124, information pertaining to the health of augmented distribution transformer 118, times when a load reduction request was transmitted, and/or an identification of electric device 124.

According to embodiments of the invention, augmented distribution transformer 118 also includes radiation detector 137. In such an embodiment, radiation detector 137 is configured to detect radiation and, if radiation is detected, relay notification of the detected radiation to a third party such as a national security agency. It is contemplated that either radiation detector 137 has the ability to relay such information or that communications module 126 relay such information. According to one embodiment, radiation detector 137 may be positioned at least partially within augmented distribution transformer 118, and according to another embodiment, it may be located externally on augmented distribution transformer 118. In either embodiment, augmented distribution transformer 118 would be configured in such a manner that would allow radiation to pass to radiation detector 137. For example, if radiation detector 137 were located within augmented transformer 118, augmented transformer 118 may include a "window" (not shown) that effectively allows radiation to pass to radiation detector 137.

As set forth above, it is contemplated that augmented distribution transformer 118 may include one or more of a variety of components (e.g., communications module 126, PLC module 128, load sensing system 130, antenna 131, Internet server 132, GPS module 133, authentication module 134, encryption module 135, memory module 136, and radiation detector 137). To monitor the health of one or more of these components or modules, it is contemplated that augmented distribution transformer 118 may include diagnostic module 138. According to such an embodiment, diagnostic module 138 would be configured to monitor one or more of the components to determine a health status of those components monitored. The health status could then be relayed to a party of interest via, for example, PLC module 128 along high voltage distribution line 120 or by another means (e.g., wirelessly via antenna 131). Alternatively, or in addition thereto, diagnostic module 138 could store the health status information in a memory module such as memory module 136 for later retrieval and/or for back-up.

In addition to having the ability to monitor one or more of components 126-137, it is envisioned that diagnostic monitor 138 may also have the ability to assess the health status of other components or parts (not shown) of augmented transformer 118. For example, diagnostic module 138 may have the ability to monitor the windings (not shown) of augmented transformer 118 to assess the wear or load thereon. Additionally, or alternatively thereto, it is contemplated that diagnostic health module 138 may determine voltage, current, and/or power levels of augmented distribution transformer 118. Diagnostic module 138 may then determine if the voltage, current, and/or power levels exceed threshold level(s). If so, communication module 126 may send control information to the power distribution system or energy provider indicating that augmented distribution transformer 118 is operating at level(s) above threshold level(s). Such control information may be used, for example, to determine whether or not augmented distribution transformer 118 should be replaced with another augmented distribution transformer (not shown) having a greater operating capacity. Further, such information may cause a remote device to convey a load reduction transmit command to augmented distribution transformer 118, thus causing communications module 126 to transmit a load reduction request to electrical device 124. Accordingly, diagnostic module 138 may serve as an alternative to load sensing system 130.

It is envisioned that diagnostic module 138 may also have the ability to determine the health status of augmented distribution transformer 118 via analysis of data received from sensor system 118. It is contemplated that sensor system 140 may be configured to provide transformer temperature data, transformer pressure data, ambient temperature data, ambient barometric pressure data, and/or other diagnostic data to diagnostic module 138 for diagnostic health analysis.

To power one or more of components 126-140, it is contemplated that augmented distribution transformer 118 may include battery 143, a rechargeable battery, and/or other capacitive device. Alternatively, or in addition thereto, one or more components 126-138 of augmented distribution transformer 118 may be powered by augmented distribution transformer 118 via electricity from high voltage distribution line 120. This electricity could either be in the high voltage form (prior to step down) or in a low voltage form (after step down). It is noted that diagnostic module 138 could also be configured to assess the health or charge of battery 143 or the like. In such an embodiment, augmented distribution transformer 118 could either store the health status of battery 143 in memory module 136 and/or provide such health status information to a party of interest.

As discussed above, it is contemplated that communications module 126 may include a computer or processor 139. According to an embodiment of the invention, processor 139 aids in the control of components 128-138, 140-143. However, it is envisioned that, in addition to or alternatively, one or more components 128-138, 140-143 may include a processor (not shown) for control.

FIG. 4 is block diagram of an exemplary intermediary device 152 according to an embodiment of the invention. As explained above with respect to FIG. 2, it is contemplated that the electrical device (e.g., electrical device 124) coupled to the low voltage line(s) (e.g., low voltage line 122) may an intermediary device. Intermediary device 152 of FIG. 4 depicts an example of such a device.

According to an embodiment of the invention, intermediary device 152 is coupled to a low voltage line 154, which is coupled to an augmented distribution transformer 156. Augmented distribution transformer 156 is configured to provide at least a load reduction request to intermediary device 152 from augmented distribution transformer 156 via low voltage line 154. Further, augmented distribution transformer 156 is configured to provide power to a plurality of electrical devices 158-164 via low voltage line 154 and intermediary device 152.

According to an embodiment of the invention, intermediary device 152 includes a plurality of circuits 166-172, where each circuit 166-172 is configured to convey power to at least one electrical device 158-164, respectively. It is envisioned that intermediary device 152 may include more or less circuitry than that shown (166-172) to convey power to more or less electrical devices than those shown (158-164).

Intermediary device 152 includes a processor 174 configured to control power conveyance though each circuit 166-172. For example, augmented distribution transformer 156 may transmit a load reduction request to intermediary device 152 via low voltage line 154. Processor 174 may then determine which, if any, electrical device 158-164 will have its load reduced.

In other words, intermediary device 152 serves as a load balancing system. The following exemplary scenario will illustrate the load balancing functionality of intermediary device 152 according to one embodiment. According to one scenario, electrical device 158 may be a clothes dryer, electrical device 160 may be a water heater, electrical device 162 may be a furnace motor, and electrical device 164 may be a PHEV. Upon receiving a load reduction request from augmented distribution transformer 156, processor 174 may determine that the furnace motor 162 cannot or should not have its load reduced. Further, processor 174 may determine that at least one of the clothes dryer 158, the water heater 160, and the PHEV 164 may have its load reduced. As such, processor 174 may cause at least one of circuits 166, 168, 172 to reduce the power provided to its respective electrical device 158, 160, 164. As such, the load drawn on augmented distribution transformer 156 will be reduced.

Figure 5:
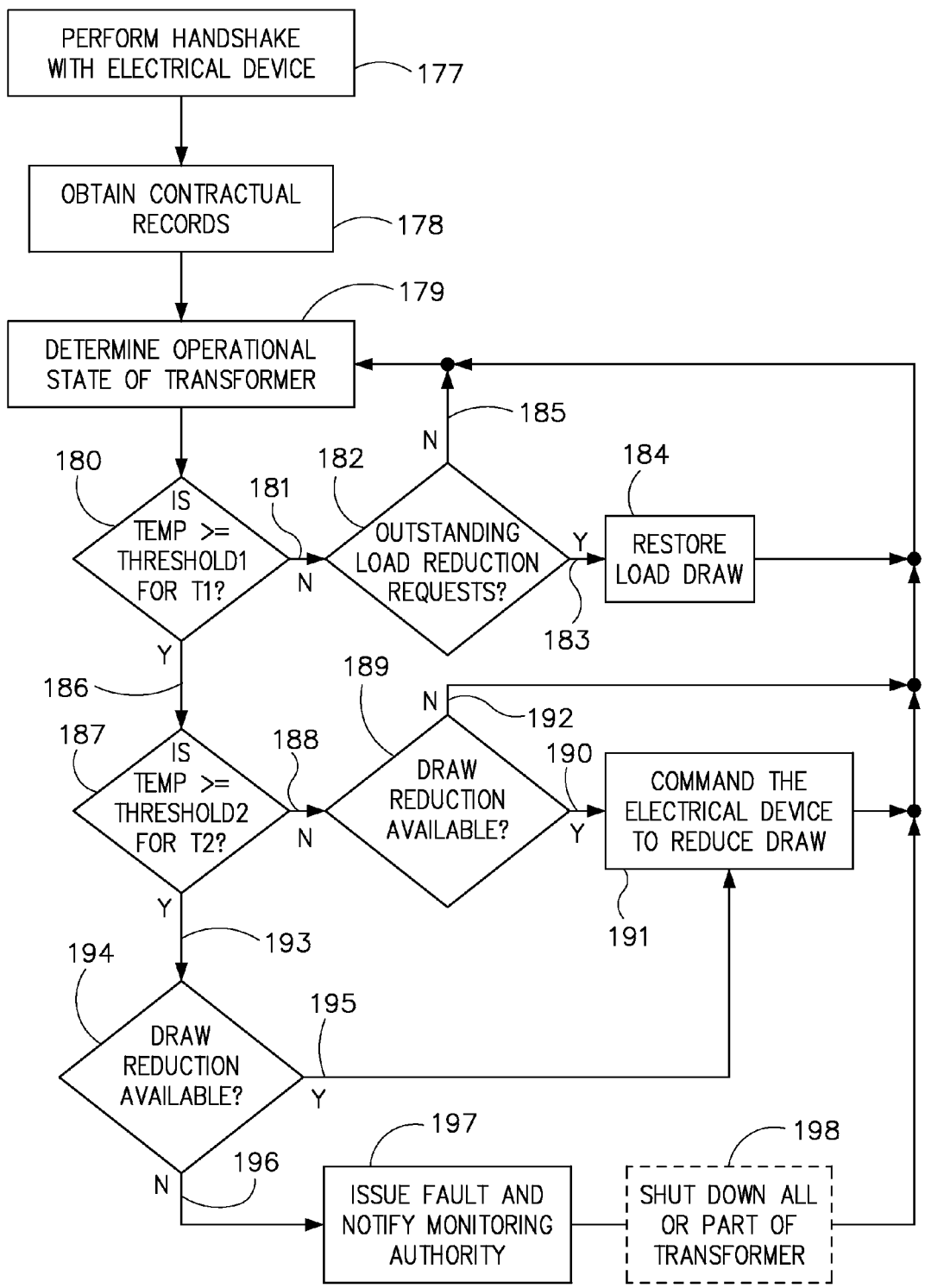
FIG. 5 is a flowchart of a technique for supplying energy from an augmented distribution transformer to an electric device according to an embodiment of the invention.

FIG. 5 is a flowchart of a technique 176 for supplying energy from augmented distribution transformer 118 to electrical device(s) 124 according to an embodiment of the invention. Technique 176 begins at step 177 by performing a handshake algorithm between augmented distribution transformer 118 and each electrical device 124 when connected to receive energy from transformer 118. During the handshake algorithm, transformer 118 establishes a communication with the electrical device 124 and receives information from the electrical device 124 that may indicate, for example, the type of device (e.g., PHEV) that electrical device 124 is and an expected electrical load power and energy (kW, kWh) that electrical device 124 projects to draw from transformer 118.

At step 178, contractual records pertaining to energy conveyance from transformer 118 to electrical device 124 is obtained. FIG. 6 is a flowchart of a technique 199 for obtaining contractual records pertaining to energy conveyance according to an embodiment of the invention. At block 200, an augmented transformer relays energy transfer contract terms to a PHEV or other electrical device via a low voltage line. It is contemplated that energy transfer contract terms include, for example, a credit per kilowatt-hour value, a debit per kilowatt-hour value, and/or time or date dependent rates. It is also contemplated that the energy transfer contract terms include an identification unique to the PHEV. At block 201, the PHEV receives the energy transfer contract terms from the augmented transformer via the low voltage line.

At block 202, the PHEV determines whether to accept or decline the energy transfer contract terms. If the PHEV decides to decline the energy transfer contract terms 203, process control proceeds back to block 200.

On the other hand, if the PHEV accepts the energy transfer contract terms 204, the PHEV sends an energy transfer request to the augmented transformer at block 205. At block 206, the augmented transformer saves the contract terms in a computer readable storage medium (e.g., memory module 136 of FIG. 3) and/or conveys the contract terms to a third party. At block 207 of FIG. 5, the augmented transformer initiates and monitors the energy transfer. It is noted that the energy transfer may pertain to the PHEV either receiving energy via the augmented transformer (i.e., receive a charge) or to the PHEV providing energy to a high voltage line via augmented transformer. In either scenario, as the augmented transformer monitors the energy transfer, it is contemplated that as the augmented transformer monitors the energy transfer, the augmented transformer saves a record of the energy transfer to a computer readable storage medium and/or transfer that information to a third party.

Since the contract terms may include an identification unique to the PHEV, the contract terms along with the record of the energy transfer may be used to bill the owner or user for energy consumed. Alternatively, if the PHEV provides electricity rather than receives electricity, the contract terms along with the record of energy transfer may be used by a third party to provide a credit to the owner or user of the PHEV.

Though technique 199 has been described in terms of a PHEV and an augmented transformer, it is contemplated that technique 199 be equally applicable in a scenario where another type of electric device, other than a PHEV, is employed. For example, rather than a PHEV, a home or residence could be may be outfitted or retrofitted with an electrical device that negotiates energy conveyance terms with the augmented transformer. In such an embodiment, the contract terms and record of energy conveyance could be used to "bill" the home owner or resident or to provide the home owner or resident a credit.

Returning again to technique 176 of FIG. 5, after the contractual records are obtained, energy may be supplied to electrical device 124 according to the contract and according to the availability of transformer 118 to supply energy thereto. Accordingly, at step 179, technique 176 determines an operational state or status of transformer 118 to supply energy to all electrical devices connected thereto, including electrical device(s) 124 for which a handshake protocol has been established. To determine the operational status of transformer 118, processor 139 may determine an internal temperature of transformer 118 using transformer temperature sensor 142 to sense a temperature of the coolant flowing in cooling system 125 or other component as described above and may determine the ambient temperature of the ambient or outside environment surrounding transformer 118 using temperature sensor 141, for example.

At step 180, technique 176 determines whether a temperature of transformer 118 is greater than or equal to a first threshold (Threshold1) for at least a sustained period (T1), which represents a time sufficient to avoid anomalies or nuisance faults due to sensor glitches, for example. The first threshold represents a temperature at which transformer life may be affected or reduced upon continued operation of transformer 118 at or above that temperature. If the operational status of transformer 118 indicates that its temperature is below Threshold1 181, technique 176 checks to see whether there are any outstanding load reduction requests at step 182. As will be explained below, technique 176 may issue load reduction requests to electrical devices coupled to receive power from transformer 118 should the operational status of transformer 118 be determines to be detrimental to its life expectancy. Accordingly, at step 181, since the temperature of transformer 118 is determined to be below the threshold considered to begin reduction of transformer life expectancy, any or all outstanding previous load reduction requests may thus be rescinded or canceled in order to supply full power to such devices. If any outstanding load reduction requests are determined to exist 183, the load drawn to such devices is restored at step 184, and process control is returned to step 179. If there are no outstanding load reduction requests 185, technique 176 returns process control to step 179.

Returning to step 180, if the operational status of transformer 118 indicates that its temperature is above Threshold1 186 or, alternatively, that its temperature, total load, or the ambient temperature is approaching Threshold1, technique 176 determines whether a temperature of transformer 118 is greater than or equal to a second threshold (Threshold2) for at least a second sustained period (T2) at step 187. An algorithm for determining an approach to the level of Threshold1 may include ambient temperature trends versus time of day.

According to an embodiment of the invention, Threshold2 is greater than Threshold1 and represents a temperature at which component failure of transformer 118 may be imminent upon continued operation of transformer 118 at or above that temperature. Similar to period T1, period T2 may represents a time sufficient to avoid anomalies or nuisance faults due to sensor glitches, for example. In addition, period T2 may also be for a shorter time than that of period T1. For example, it may be determined that transformer 118 may be able to withstand an operating temperature above Threshold1 for a longer time than an operating temperature above a higher Threshold2.

If the temperature of transformer 118 is below Threshold2 188 (but still above Threshold1) or if a difference between the temperature of the distribution transformer and the temperature of the ambient environment is above another temperature threshold (Threshold3), technique 176 determines, at step 189, whether a draw reduction is available for any of the devices coupled to transformer 118 such that the load on transformer 118 may be reduced. Reducing the load drawn from transformer 118 will reduce its operating temperature. Technique 176 may determine that a draw reduction is available by checking the data exchanged with the devices when the contractual records were received (step 178). The total number of devices capable of load reduction that are being charged using electrical power supplied by distribution transformer 118 are taken into consideration as is information as to the maximum expected electrical load power and energy (kW, kWh) from each device. Because the devices are available for load reduction, flexibility as to time of day when charging is to be completed for a PHEV, for example, and a customer willingness to pay a higher premium for supplying energy to the device in a given amount of time for charging to be completed by a specified time, may allow distribution transformer 118 to temporarily reduce its load to lower its operation at an elevated temperature. Then, as the base load and temperatures of the ambient and transformer reduce, previous load reduction request could be re-adjusted to allow one or all of the devices connected to transformer 118 to be supplied with energy at a level up to the level prior to the reduction request.

If a draw reduction is available 190, one or more electrical devices available for load reduction are commanded to reduce their electrical draw at step 191. Selection of which electrical devices to command to reduce their load draw may be determined, for example, by estimating the amount of load that could be reduced if the reduction command is carried out.

Process control then returns to step 179. If a draw reduction is not available 192, then process control returns to step 179 without having its load reduced. While not ideal, operation of transformer 118 above Threshold1 may still be allowable even though its life may be expected to be reduced as a result.

Returning to step 187, if the temperature of transformer 118 is above Threshold2 193, technique 176 determines, at step 194, whether a draw reduction is available for any of the devices coupled to transformer 118 such that the load on transformer 118 may be reduced to reduce its operating temperature. If a draw reduction is available 195, one or more electrical devices available for load reduction are commanded to reduce their electrical draw at step 191. Process control then returns to step 179. If a draw reduction is not available 196, then a fault is issued and a monitoring authority is notified at step 197. According to one embodiment, process control may be returned to step 179 to allow continued operation of transformer 118. While not ideal, operation of transformer 118 above Threshold2 may still be allowable even though a major near-term effect on transformer life may result. However, it is contemplated that technique 176 may cause transformer 118 to shut down all or a part of its load supplying capability as shown in phantom at step 198 even though none of the devices connected thereto has agreed to have a reduced draw. The monitoring authority may also choose which loads should be disconnected from the transformer.

Therefore, according to an embodiment of the invention, a system comprises a distribution transformer comprising a communications module and a sensor system. The distribution transformer is configured to convert a first high voltage electricity from a high voltage distribution line to a first low voltage electricity and convey the first low voltage electricity along a low voltage line to an electrical device. The sensor system is configured to determine a temperature of the distribution transformer, and the communications module is configured to transmit a load reduction request along the low voltage line to the electrical device based on the temperature of the distribution transformer.

According to another embodiment of the invention, a method of manufacturing an electrical system comprises assembling a distribution transformer capable of stepping down high voltage electricity from a high voltage distribution line and conveying stepped down electricity along a low voltage line to power an electrical device, wherein the high voltage distribution line is configured to transfer a higher voltage electricity than the low voltage line. The method also includes configuring a sensor system to determine a temperature of the distribution transformer, generating a load reduction request to reduce a load drawn from the distribution transformer by the electrical device based on the temperature of the distribution transformer, and coupling a communications module to the distribution transformer and to the low voltage line, the communications module configured to convey the load reduction request along the low voltage line to the electrical device.

According to yet another embodiment of the invention, an apparatus comprises a distribution transformer configured to step down electricity received from a high voltage distribution power line and to provide the stepped down electricity to an electrical device via a low voltage power line. The apparatus also includes a temperature sensor system configured to determine a temperature of the distribution transformer and a communications system coupled to the distribution transformer and configured to transmit a request along the low voltage line to the electrical device, wherein the request is a request to reduce a load on the distribution transformer based on a temperature of the distribution transformer.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
a distribution transformer comprising a communications module and a sensor system, the distribution transformer configured to:
convert a first high voltage electricity from a high voltage distribution line to a first low voltage electricity;
convey the first low voltage electricity along a low voltage line to an electrical device;
wherein the sensor system comprises a temperature sensor configured to determine a temperature of the distribution transformer;
wherein the sensor system comprises a temperature sensor configured to determine a temperature of an ambient environment surrounding the distribution transformer; and
wherein the communications module is configured to transmit a load reduction request along the low voltage line to the electrical device based on the temperature of the distribution transformer and based on the temperature of the ambient environment, with the communications module transmitting the load reduction request if the temperature of the ambient environment is above a first temperature threshold and if a difference between the temperature of the distribution transformer and the temperature of the ambient environment is above a second temperature threshold.

2. The system of claim 1 wherein the distribution transformer further comprises a cooling system having a coolant therein; and
wherein the sensor system is configured to determine the temperature of the coolant.

3. The system of claim 1 wherein the communications module, in being configured to transmit the load reduction request, is configured to transmit the load reduction request if the determined temperature of the distribution transformer is above a temperature threshold.

4. The system of claim 1 wherein the communications module, in being configured to transmit the load reduction request, is configured to transmit the load reduction request if the determined temperature of the distribution transformer has approached a temperature threshold.

5. The system of claim 1 wherein the distribution transformer is further configured to perform a handshake algorithm with the electrical device to establish a communication therewith.

6. The system of claim 5 wherein the distribution transformer is further configured to receive an expected electrical load power from the electrical device indicating a projected power draw from the distribution transformer to the electrical device.

7. The system of claim 1 wherein the communications module is further configured to rescind the load reduction request if the temperature of the distribution transformer is below a temperature threshold.

8. The system of claim 7 wherein the distribution transformer is further configured to disable supplying power to the electrical device if the electrical device is unable to comply with the load reduction request.

9. The system of claim 8 wherein the distribution transformer is further configured to issue a fault notification to a monitoring authority.

10. A method of manufacturing an electrical system comprising:
assembling a distribution transformer capable of stepping down high voltage electricity from a high voltage distribution line and conveying stepped down electricity along a low voltage line to power an electrical device, wherein the high voltage distribution line is configured to transfer a higher voltage electricity than the low voltage line;
configuring a sensor system to determine a temperature of the distribution transformer and a temperature of an ambient environment of the distribution transformer;
generating a load reduction request to reduce a load drawn from the distribution transformer by the electrical device based on the temperature of the distribution transformer and based on the temperature of the ambient environment; and
coupling a communications module to the distribution transformer and to the low voltage line, the communications module configured to convey the load reduction request along the low voltage line to the electrical device;
wherein generating the load reduction request further comprises generating the load reduction request if the temperature of the ambient environment is above a first temperature threshold and if a difference between the temperature of a cooling system of the distribution transformer and the temperature of the ambient environment is above a second temperature threshold.

11. The method of claim 10 wherein configuring the sensor system comprises configuring the sensor system to determine a temperature of the cooling system of the distribution transformer.

12. The method of claim 10 further comprising generating a rescind request to rescind the load reduction request if the temperature of the distribution transformer is below a temperature threshold.

13. The method of claim 10 further comprising disabling a supply of power to the electrical device if the electrical device is unable to comply with the load reduction request.

14. An apparatus comprising:
a distribution transformer configured to:
step down electricity received from a high voltage distribution power line; and
provide the stepped down electricity to an electrical device via a low voltage power line;
a temperature sensor system comprising:
a transformer temperature sensor configured to determine an internal temperature of the distribution transformer; and
an ambient temperature sensor configured to determine a temperature of an ambient environment surrounding the distribution transformer; and
a communications system coupled to the distribution transformer and configured to transmit a request along the low voltage line to the electrical device, wherein the request is a request to reduce a load on the distribution transformer based on the internal temperature of the distribution transformer and the temperature of the ambient environment surrounding the distribution transformer;
wherein the communications system transmits the request to the electrical device if the temperature of the ambient environment is above a first temperature threshold and below a second temperature threshold, and if a difference between the temperature of the distribution transformer and the temperature of the ambient environment is above a third temperature threshold.

15. The apparatus of claim 14 wherein the distribution transformer comprises a cooling system having a coolant therein configured to cool the distribution transformer, wherein the temperature sensor system is configured to determine a temperature of the coolant.

16. The apparatus of claim 14 wherein the distribution transformer is programmed to generate the request if the temperature of the distribution transformer exceeds the first temperature threshold.

17. The apparatus of claim 16 wherein the distribution transformer is programmed to rescind the request if the temperature of the distribution transformer is below the first temperature threshold.

18. The apparatus of claim 16 wherein the distribution transformer is programmed to disable supplying power to the electrical device if the temperature of the distribution transformer exceeds the second temperature threshold, the second temperature threshold greater than the first temperature threshold.

* * * * *